(12) United States Patent
Qu et al.

(10) Patent No.: US 6,854,063 B1
(45) Date of Patent: *Feb. 8, 2005

(54) METHOD AND APPARATUS FOR OPTIMIZING FIREWALL PROCESSING

(75) Inventors: Diheng Qu, Santa Clara, CA (US); Kevin Li, Milpitas, CA (US); Sami Boutros, Kanata (CA); Seren Fan, Palo Alto, CA (US); Steve Truong, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/517,961

(22) Filed: Mar. 3, 2000

(51) Int. Cl.[7] .................... G06F 15/173; G06F 15/177; H04L 9/00; H04L 12/28; H04L 12/56
(52) U.S. Cl. .................... 713/201; 370/392; 709/238
(58) Field of Search ................ 713/201; 370/392; 709/238

(56) References Cited

U.S. PATENT DOCUMENTS

| | | | | |
|---|---|---|---|---|
| 5,796,942 A | * | 8/1998 | Esbensen ............ | 713/201 |
| 5,842,040 A | | 11/1998 | Hughes et al. ....... | 395/831 |
| 5,898,830 A | * | 4/1999 | Wesinger et al. ..... | 713/201 |
| 6,067,569 A | * | 5/2000 | Khaki et al. ........ | 709/224 |
| 6,147,976 A | * | 11/2000 | Shand et al. ........ | 370/254 |
| 6,157,955 A | * | 12/2000 | Narad et al. ........ | 709/228 |
| 6,170,012 B1 | * | 1/2001 | Coss et al. ......... | 709/229 |
| 6,182,149 B1 | * | 1/2001 | Nessett et al. ...... | 709/247 |
| 6,219,706 B1 | * | 4/2001 | Fan et al. .......... | 709/225 |
| 6,321,259 B1 | * | 11/2001 | Ouellette et al. .... | 709/220 |
| 6,496,935 B1 | * | 12/2002 | Fink et al. ......... | 713/201 |
| 6,680,941 B1 | * | 1/2004 | Schmitz ............. | 370/392 |

FOREIGN PATENT DOCUMENTS

| WO | WO97/24841 | 10/1997 | ............ H04L/12/46 |

OTHER PUBLICATIONS

Blake et al., RFC 2475, "An Architecture for Differentiated Services," 1998.*

* cited by examiner

*Primary Examiner*—Gregory Morse
*Assistant Examiner*—Matthew Heneghan
(74) *Attorney, Agent, or Firm*—Sierra Patent Group, Ltd.

(57) ABSTRACT

A firewall system and method which optimizes the performance of the firewall process by reducing overhead associated with ACL verification and firewall application-level authorization. The firewall system comprises a session manager operating in the firewall services component and a firewall module operating in the switching process component. In one embodiment, the firewall module is configured to provide certain "non-application" level inspection of data packets and update the context of "sessions" associated with the data packets without sending the packets to the firewall services component using session information provided by the session manager.

25 Claims, 6 Drawing Sheets

METHOD AND APPARATUS FOR OPTIMIZING FIREWALL PROCESSING

BACKGROUND OF THE INVENTION

1. Field of the Invention

This invention pertains generally to firewall systems. More particularly, the invention is a firewall system and method which optimizes the performance of the firewall process by reducing overhead associated with ACL verification and firewall application-level authorization.

2. The Prior Art

Firewalls are known in the art. In general, a firewall is a combination of hardware and software which limits the exposure of a computer or group of computers to an attack from outside. The most common use of a firewall is on a local area network (LAN) connected to the global information network, known as the Internet. Without a firewall, anyone on the Internet could theoretically connect to the corporate LAN and retrieve and/or transmit information to computers on the LAN. A firewall provides services which enforce a boundary between two or more networks. In the above example, a firewall would enforce a boundary between the LAN and the Internet.

A traditional firewall is implemented through a combination of hosts and routers. A router can control traffic at the packet level, allowing or denying packets based on the source/destination address or the source/destination port number. A host (or application gateway), on the other hand, can control traffic at the application level, allowing control based on a more detailed and protocol-dependent examination of the traffic. Often, a router can be configured to provide firewall capability.

FIG. 1 depicts a block diagram of a firewall (or router with firewall capbilities) device 10 according to the prior art. Firewall 10 is shown having interface 1 (designated as 12a) and interface 2 (designated as 12b), interface 1 (12a) connected to a network 1 (14a) and interface 2 (12b) connected to network 2 (14b). As a data packet is communicated from network 1 (14a) to network 2 (14b) or from network 2 (14b) to network 1 (14a), the data is intercepted and is authorized or denied data communication based on a plurality of configuration settings as is well known in the art.

The firewall device 10 includes a plurality of services to carry out the operation of authorizing data traffic through the device 10. More particularly, the firewall device 10 includes a switching process component (or router) 16, a packet filtering component 18, and a firewall services component 20. Switching process 16 handles traffic connections associated with interfaces 12a, 12b, and routes data according to designated addresses.

The packet filtering component 18 filters data packets based on a set of rules defined in an associated Access Control List, designated ACL 22. The ACL 22 contains static as well as dynamic settings. Static settings are normally provided by a user in a configuration file. For example, the ACL 22 may define a set of IP (Internet Protocol) addresses that are permitted to communicate through firewall device 10. Dynamic settings are normally provided by the firewall services to enable certain communications, including return acknowledgement signals, for example.

The firewall services 20 provide authentication on an application level, providing among other things, protocol dependent inspection and authentication. As noted above, the firewall service 20 also configures the ACL 22 to allow certain communications to pass through the device 10.

The following example illustrates the operation of a prior art firewall device. FIG. 2 shows the structure of a typical data packet 28 transmitted through the firewall device. As is known, the data packet 28 will include a header portion 30, and a data payload component 32. The header portion 30 includes among other things, address information (such as the destination address, for example).

The data payload component 32 includes additional information such as User ID and protocol information, among other things.

When a data packet is communicated from network 14a to network 14b, for example, the data packet enters interface 12a from network 14a. The packet filtering component 18 intercepts the data packet at point 24 and determines whether the data packet is authorized to enter the router 10 via the interface 12a based on the set of rules defined in the ACL 22. Typically, the header is inspected to determine source and/or destination address information. If so authorized, the data packet is communicated back to point 24 and to the switching process 16 for routing to the appropriate interface.

The switching process 16 receives the data packet and "diverts" the data packet to the firewall services 20 for inspection and authorization. As noted above, the firewall services component 20 authenticates the data packet based on a set of protocol-dependent rules. In this way, the payload component 32 of the data packet is typically inspected to see if communication is authorized. If so authorized by the firewall services 20, the data packet is sent back to the switching process 16, which then communicates the data packet to the interface 12b via point 26. As noted above, the firewall services component 20 may also configure one or more settings within the ACL 22 to allow certain communications (return acknowledgments, for example) to pass through the router 10.

At point 26, the data packet communicated by the switching process 16 is again intercepted by the packet filtering component 18 to determine whether the data packet is authorized to exit interface 12b based of the set of rules defined in the ACL 22. If so authorized, the switching process 16 transmits the data packet to the interface 12b, via point 26, which then communicates the data packet to network 14b where the packet is further processed.

As described above, the prior art method of firewall processing involves a plurality of security authorization steps. For each data packet that is communicated through the firewall device, the authorization steps described above are carried out. In the above example firewall 10 having 2 ports 14a, 14b, two ACL authentication processes are carried out by the packet filtering component 18, one for each port. Additionally, the switching process 16 diverts the packet to the firewall services 20 for application-level authentication.

While providing security, there are performance penalties associated with the above described authorization processes for a firewall. For example, because the switching process 16 operates in a different address space from the firewall services component 20, the router device 10 suffers the overhead associated with "context switching" when a data packet is "diverted" from the switching process 16 to the firewall services 20 for inspection and authorization.

Prior art firewalls "divert" each data packet handled by switching process 16. However, since data communication transactions often involve the transfer of a plurality of data packets (rather than a single packet), the need for authorizing (and therefore diverting) each and every packet may be unnecessary, once the first in a series of associated data packets has been authorized. This is particularly evident in a data transfer, as opposed to a control transfer.

For example, an FTP transfer of a file may involve the transfer or a plurality of packets. If the first packet is authorized between a source and a destination, then the remaining associated packets would also be authorized. However, under present firewall solutions, each of the remaining packets would be diverted and authorized, and thus the overhead associated with context-switching is realized for each of the associated packets for the duration of the file transfer.

Also as noted above, the packet filtering component 18 carries out authorization based on the rules provided in the corresponding ACL 22. This authorization is carried out for each packet processed by the packet filtering component 18. As noted above, the packet is checked upon entering a port and upon exiting a port, thus incurring additional performance penalties.

Accordingly, there is a need for a method and apparatus which provides firewall security processing which minimizes the overhead with context switching and optimizes overall firewall performance. The present invention satisfies these needs, as well as others, and generally overcomes the deficiencies found in the background art.

BRIEF DESCRIPTION OF THE INVENTION

The present invention is a system and method for optimizing firewall performance, which reduces the overhead associated with firewall protocol inspection and packet filtering authorization. The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

The present system operates in a conventional firewall (or router having firewall capabilities) device having conventional hardware components, such as a central processor unit (CPU), memory, and input/output devices. The firewall device will typically further include a plurality of communication interfaces (interfaces), such as Ethernet ports and/or serial ports, for example. As such, the firewall device inspects and authenticates communication carried out between the various ports of the firewall device.

According to one embodiment of the present invention, the firewall system operates in a firewall device having a plurality of communication interfaces, a packet filtering component coupled to each of the interfaces, a switching component coupled to each of the interfaces, and a firewall services component coupled to the switching process. The firewall system comprises a session manager operating in the firewall services component. The session manager is structured and configured to instantiate a plurality of sessions in the firewall services component and a plurality of mini-sessions in the switching process component. Each of the sessions has context information captured from the header and payload information of packets of the session. Each of the mini-sessions corresponds to a session and includes header information related the corresponding data transfer within the firewall device. The mini-sessions are managed by a firewall module (or mini-session manager) residing and operating in the switching process/component. This firewall module is initiated by the session manager component and is configured to maintain data in the mini-sessions. The firewall module further determines whether to send packets from the switching process to the firewall process based on the data in the mini-sessions.

According to another embodiment of the present invention, the method for optimizing firewall processing comprises providing a session manager in the firewall services component, providing a firewall module in the switching process/component, instantiating a session, by the session manager, for data transfers within the firewall device, the sessions having header and payload information related to data transfers within the firewall device, and instantiating a mini-session, by the session manager, corresponding to the instantiated session, the mini-session having header information related to data transfers within the firewall device.

An object of the invention is to provide a firewall system and method for optimizing firewall processing that overcomes the deficiencies in the prior art.

Another object of the invention is to provide a firewall system and method for optimizing firewall processing that reduces the overhead associated with context-switching in firewall authentication.

Yet another object of the invention is to provide a firewall system and method for optimizing firewall processing that reduces the overhead associated with access control list authentication.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 3:
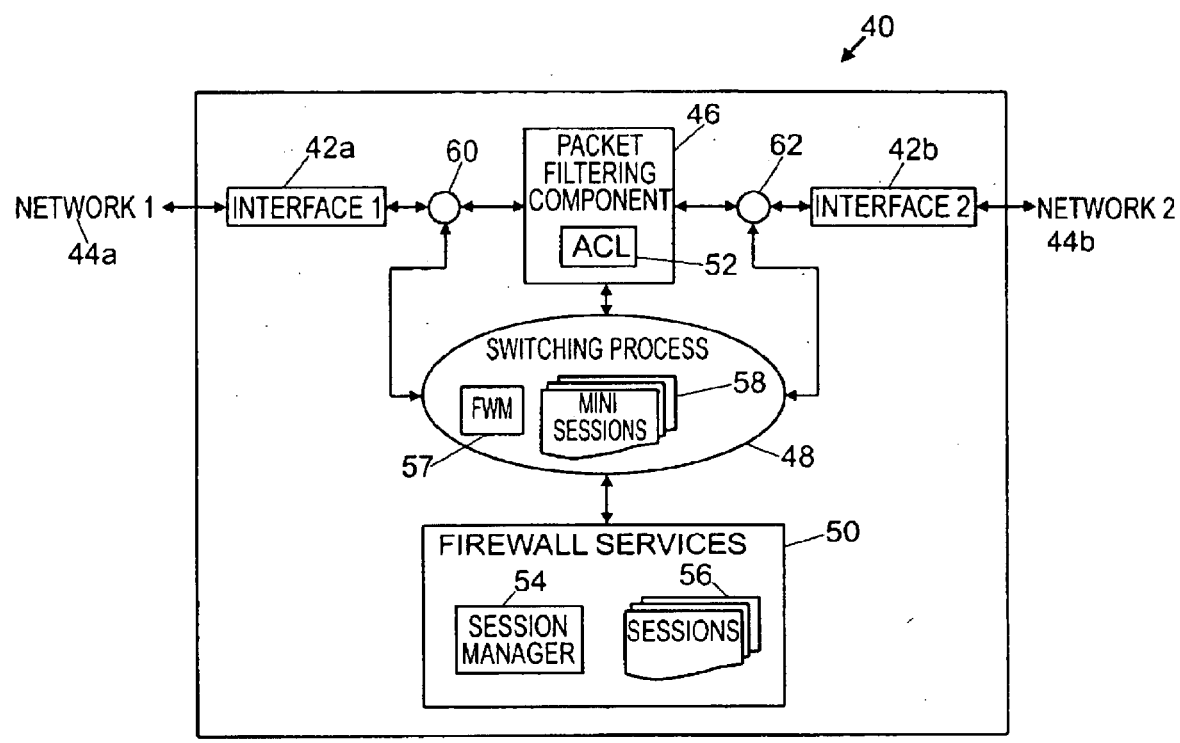
FIG. 3 is a block diagram depicting a firewall system in accordance with the present invention.
Figure 4:
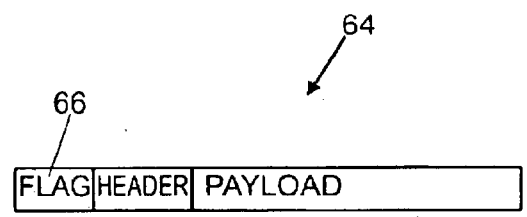
FIG. 4 is a block diagram depicting the structure of a data packet according to present invention.

Referring more specifically to the drawings, for illustrative purposes the present invention is embodied in the apparatus shown FIG. 3 and FIG. 4 and the method outlined in FIG. 5a through FIG. 7. It will be appreciated that the apparatus may vary as to configuration and as to details of the parts, and that the method may vary as to details and the order of the acts, without departing from the basic concepts as disclosed herein. The invention is disclosed generally in terms of a firewall system and method, although numerous other uses for the invention will suggest themselves to persons of ordinary skill in the art.

Referring now to FIG. 3, there is generally shown a block diagram depicting a firewall system in accordance with the present invention. The present system operates in a conventional firewall or router device 40 having conventional hardware components (not shown), such as a central processor unit (CPU), memory, and input/output devices. The firewall device will typically further include a plurality of communication interfaces (interfaces) 42a, 42b, which may be Ethernet ports and/or serial ports, for example. Interface 42a is operatively coupled for communication with a first network designated 44a, and interface 42b is operatively coupled for communication with a second network designated 44b. Network 44a, 44b comprise convention networks, such a local area network (LAN), wide area network (WAN), and/or the Internet, for example. Under this arrangement, the firewall device carries out the operation of inspecting and authenticating communication carried out between the various ports 42a, 42b of the firewall device.

The firewall system of the present invention is generally embodied in software executing and operating in the firewall 40 and carries out the operation described herein. The firewall system generally includes a packet filtering component 46, a switching process component 48, and a firewall services component 50.

The packet filtering component 46 is a software module coupled for communication to the interfaces 42a, 42b of the firewall device 40. The packet filtering component 46 inspects packets entering and exiting the communication interfaces 42a, 42b to determine whether transfer is authorized according to certain port and address settings maintained in an "Access Control List" (ACL 52). The packet filtering component 46 of the present invention, however, does not perform ACL verification for each packet processed through a port as is carried out in prior art firewall system. Rather, the packet filtering component 46 first checks the data packet for a "pass" flag which may be set by the firewall system. If the "pass" flag is set, the packet filtering component 46 bypasses ACL verification. If the "pass" flag is not set, ACL verification is carried out conventionally. This process is described more fully below in conjunction with FIG. 5a and FIG. 5b.

The switching process component 48 is a software module coupled for communication to the interfaces 42a, 42b of the firewall device. The switching process component routes packets between the interfaces 42a, 42b of the firewall device, according to address and port information, as is known in the art.

The switching process further comprises a "firewall module" (or mini-session manager), designated FWM 57. The FWM 57 is a software module operating in the same memory space as switching process 48 which performs session tracking operations, including "non-application-level" inspection of data packets, and "diverting" data packets to the firewall services 50 for inspection and authorization thereof when appropriate as described in further detail in conjunction with FIG. 7 below. The FWM 57 is initiated during the startup of the device 40 by the firewall services 50.

The FWM 57 is coupled to one or more "mini-sessions" (generally designated as 58) which are described in more detail below in conjunction with FIG. 5a through FIG. 7. The "mini-sessions" are instantiated software modules residing in the same address space as the switching process component 48 which contain session information data used by the FWM 57 for processing data packets.

The firewall services component 50 is a software module coupled for communication to the switching process component 48 which inspects and authorizes packets according to information in the payload component of the packet, the process of which is known in the art.

According to the present invention, once a data packet from a first address is authorized for transfer to a second address, the firewall system authorizes "future" data transfers between the first and second addresses to complete the data transfer so authorized. In this way, the system provides a means for authorizing such "future" data transfers without ACL authorization and firewall "application-level" authorization in order to complete the data transfer transaction. To this end, the firewall system of the present invention provides a session manager 54 operating within the firewall services component 50. The session manager 54 is configured to create, manage and delete a plurality of sessions 56 in the firewall services and a plurality of "mini-sessions" 58 in the switching process component 48.

In general, when the firewall services 50 encounters a data packet (an FTP data transfer, for example), as opposed to a control packet (a login command, for UL example), for transfer within the firewall 40, the session manager 54 instantiates a corresponding session 56, for storing among other things, header data (addresses and port information, for example) as well as payload data (user id and communication protocol, for example) to track the data transfer. This instantiated session 56 is maintained in the firewall services 50 by the session manager 54 until the data transfer is either completed or exceeds a predetermined timeout (a period of time during which no corresponding data transfer is carried out). The session manager 54 further instantiates a corresponding "mini-session" 58 in the switching process 48 which contains, among other things, corresponding header data used by the FWM 57. In this manner, for each session 56 maintained by the session manager 54, there is a corresponding mini-session 58 in the switching process 48.

The processes of the FWM 57 in conjunction with the mini-sessions 58 are described further below in conjunction with FIG. 6. In general, the FWM 57 is configured to intercept data packets entering the interfaces 42a, 42b of the firewall 40, preferably before the packet filtering component 46 intercepts the packet for ACL verification. The FWM 57 then compares the data in the header component of the intercepted packet to corresponding data in each mini-session 58 to determine whether the packet is authorized to pass without authorization. A packet is authorized when a source and destination address and port number specified in the header matches corresponding source and destination address port number in one of the mini-sessions. If so, the FWM 57 sets a "pass" flag in the packet to communicate that ACL verification is to be bypassed and a "do not divert" flag to communicate that firewall "application" level authorization is to be bypassed.

The FWM 57 is also configured to update the connection state "in-place" (i.e., without sending the packets to the firewall process). This ability is particularly important to reduce the overhead involving context switching between different processes, i.e., the switching process and the firewall services component process. Without this "in-place" inspection, all packets would have to be sent to an external process (e.g., the firewall services 50), causing additional overhead and latency. The scope of this invention does not limit the capability of the mini-session manager just to a subset of the connections or sessions. While the illustrative FWM 57 in FIG. 3 performs non-application-level inspection, it is possible to create a firewall module that has the ability to perform application-level inspection and therefore eliminate the need to transfer packets to an external process once the inspection of a new connection begins. However, to provide speed at the switching process 48 level, the FWM 57 described in FIG. 3 is configured to carry out non-application-level inspection.

FIG. 4 depicts an example data structure for a data packet 64 where flag bits may be set in slot 66 by the FWM 57 to define the "pass" state and the "do not divert" state as described above. For example, slot 66 may comprise two bits, the first bit ("pass" bit) for defining "pass" state and the second bit ("do not divert" bit) for defining the "do not divert" state. While depicted as the first slot of the data structure 64, the communication of a "pass" flag and "do not pass" flag may be carried out using various other slot arrangements as is known in the art.

Once a data transfer is completed, the associated session 56 and mini-session 58 is deleted. In general, the FWM 57 monitors communications between the interfaces 42a, 42b for signals indicating a completed transfer as is known in the art. Once this signal is so detected, a "delete" request is sent to the session manager 54 by the FWM 57. In response, to the "delete" request, the session manager 54 deletes corresponding session 56 and mini-session 58. Sessions 56 and corresponding mini-sessions 58 are also deleted if the data transfer associated therewith is idle (not communicating) for a predetermined period of time ("timeout" period).

The method and operation of invention will be more fully understood with reference to the flow charts of FIG. 5a through FIG. 7, as well as FIG. 3 and FIG. 4. The order of actions as shown in FIG. 5a through FIG. 7 and described below is only exemplary, and should not be considered limiting.

Figure 1:
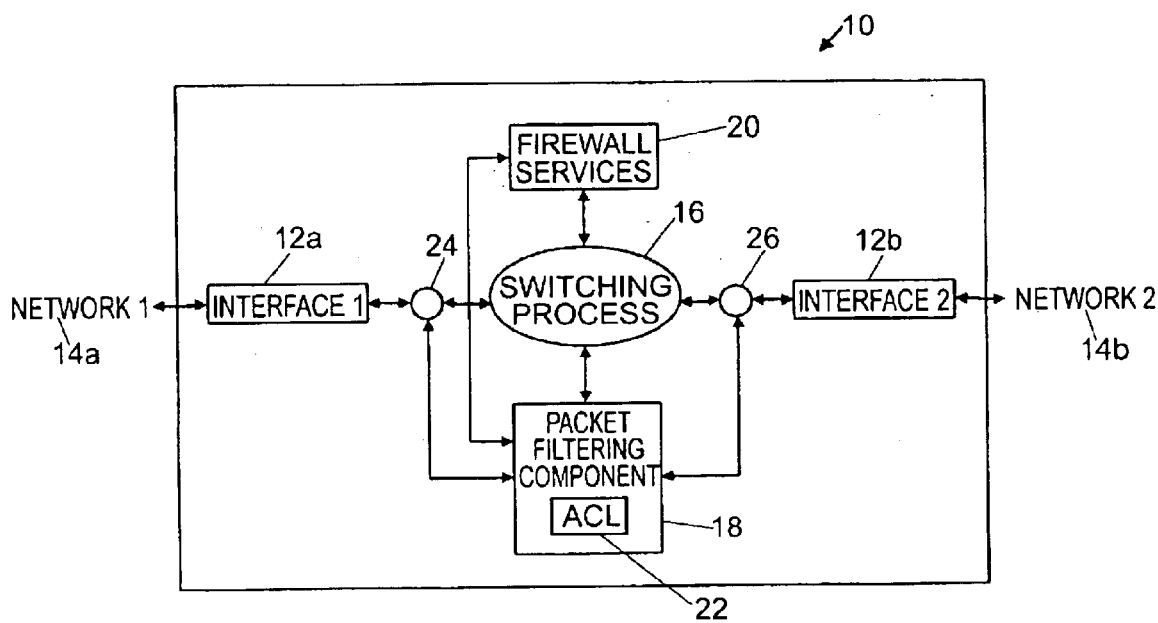
FIG. 1 is a block diagram depicting a firewall system according to the prior art.
Figure 2:
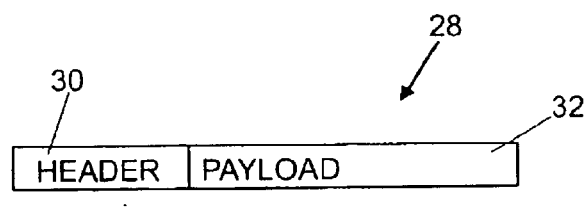
FIG. 2 is a block diagram depicting the structure of a conventional data packet.
Figure 5A:
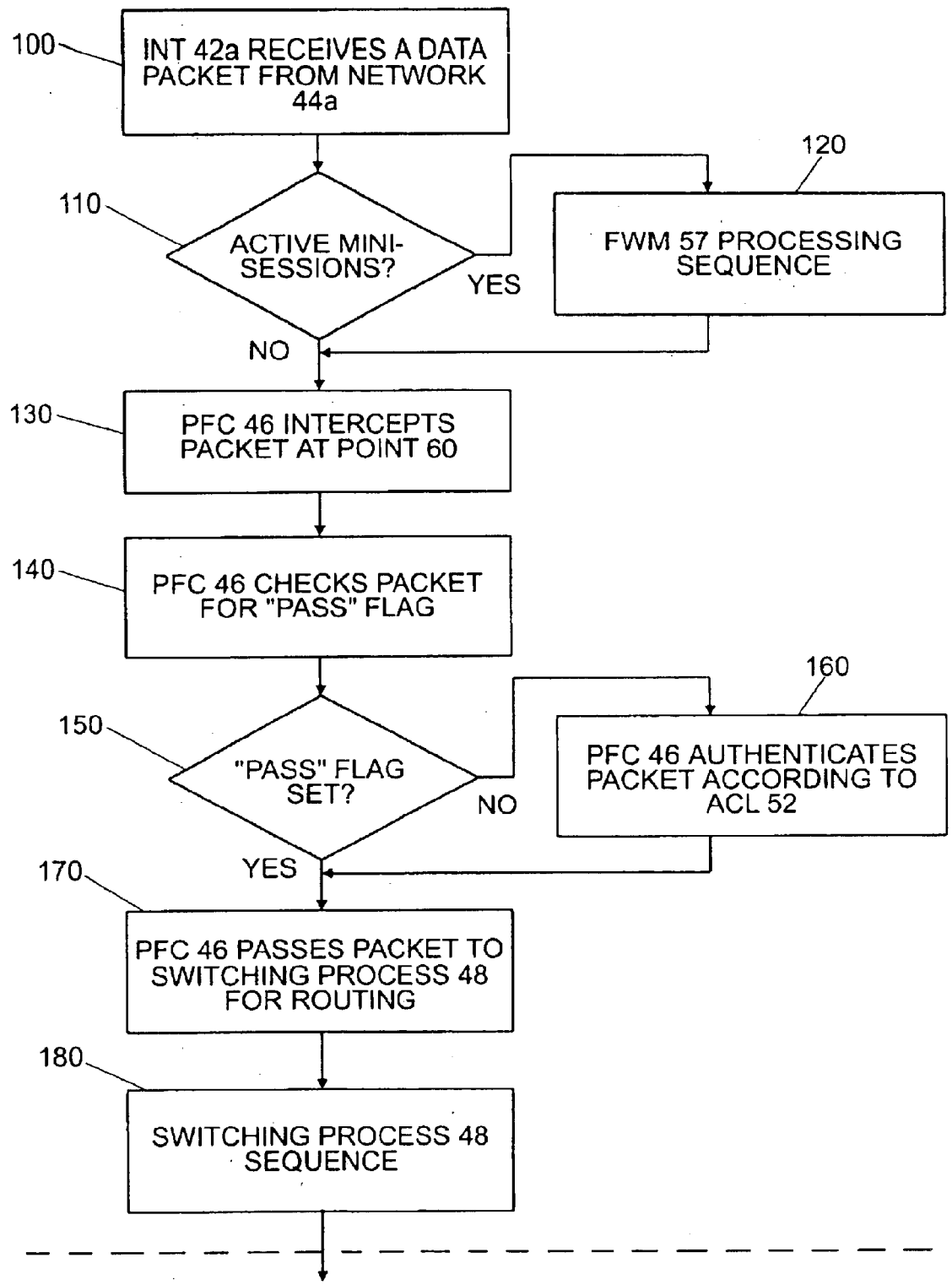
FIGS. 5*a*, and 5*b* is a flow chart generally showing the acts associated with carrying out firewall system processes in accordance with the present invention.
Figure 5B:
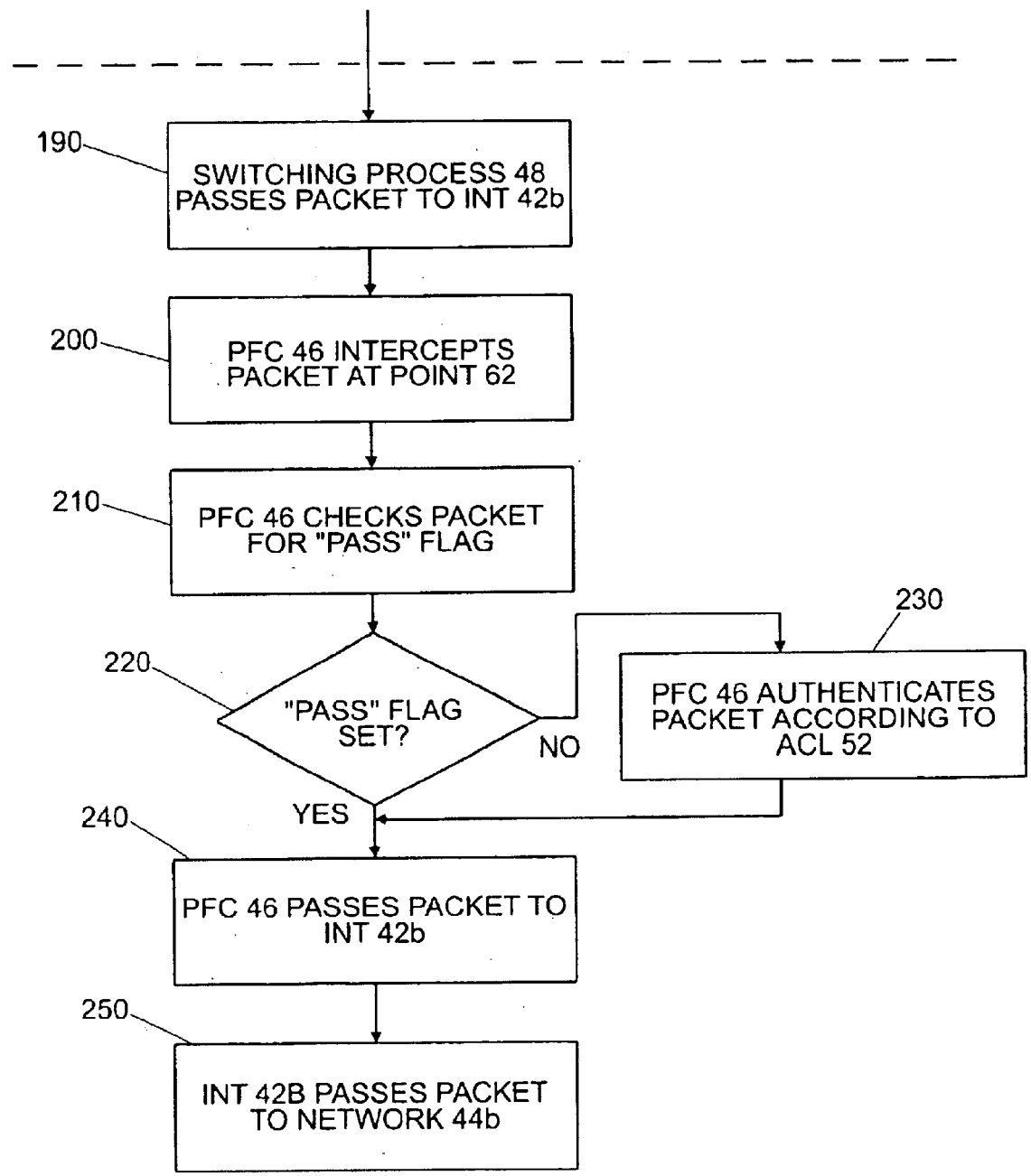

Referring next to FIG. 5a and FIG. 5b, as well as FIG. 2 through FIG. 4, there is generally shown the acts associated with the firewall system processes of the present invention. FIG. 5a and FIG. 5b depict the example situation where a data packet is communicated from Network 1 to Network 2. An analogous series of acts are carried out for data packets communicated from Network 2 to Network 1.

At box 100, Interface 42a receives a data packet from Network 1 for communication to Network 2. The data packet will typically be structured as packet 28 (FIG. 2) having a header component and a payload component. In general, the header component includes source and destination address information as well as port information. Box 110 is then carried out.

At box 110, the FWM 57 operating in the switching process 48 ascertains whether there are any active mini-sessions 58 operating therein. As described above, mini-deleted sessions 58 are instantiated and deleted during operation of the firewall device 40. If there are active mini-sessions 58, box 120 is carried out. Otherwise, box 130 is carried out.

At box 120, the FWM 57 processing sequence is carried out. This sequence is described in more detail in conjunction with FIG. 6 below. After the FWM 57 processing sequence is completed, box 130 is then carried out.

At box 130, the packet filtering component (PFC) 46 intercepts the packet at point 60 before the switching process 48 carries out routing tasks (described in box 180 below). Box 140 is then carried out.

At box 140, the PFC 46 inspects the intercepted data packet to determine whether a "pass" flag is set. In this way, the PFC 46 checks a predetermined slot in the data structure. For example, in FIG. 4, flag slot 66 may contain a "1" bit in the appropriate bit location (i.e., the "pass" bit) to indicate a "pass". Diamond 150 is then carried out.

At diamond 150, the PFC 46 determines whether the "pass" flag is set in the intercepted data packet. If the "pass" flag is set, box 170 is then carried out to bypass the ACL verification. Otherwise, box 160 is carried out.

At box 160, the PFC 46 authenticates the packet entering interface 42a according to the settings provided in the ACL 52 as is known in the art. This typically involves comparing the header of the packet to corresponding settings in the ACL 52. Packets which are authorized are further processed, while unauthorized packets are dropped. Box 170 is then carried out.

At box 170, the PFC 46 returns the packet for processing by the switching component 48. Box 180 is then carried out.

At box 180, the switching process 48 sequence is carried out. In general, this sequence includes, among other things, routing the packet to the appropriate interface as well as verifying the packet with the firewall services component 50 when appropriate. This sequence is described more fully below in conjunction with FIG. 7. Box 190 is then carried out.

At box 190, the switching process 48 routes the packet to the appropriate interface, which in the present example is interface 42 (for communication to Network 44b). Box 200 is then carried out.

At box 200, the packet filtering component (PFC) 46 intercepts the packet at point 62 before the packet is received by interface 42b. Box 210 is then carried out.

At box 210, the PFC 46 inspects the intercepted data packet to determine whether a "pass" flag is set. As described above in box 140, the PFC 46 check a predetermined slot in the data structure. Diamond 220 is then carried out.

At diamond 220, the PFC 46 determines whether the "pass" flag is set in the intercepted data packet. If the "pass" flag is set, box 240 is then carried out to bypass ACL verification. Otherwise, box 230 is carried out.

At box 230, the PFC 46 authenticates the packet exiting via interface 42b according to the settings provided in the ACL 52. As noted above, ACL verification typically involves comparing the header of the packet to corresponding settings in the ACL 52. Packets which are authorized are further processed, while unauthorized packets are dropped. Box 240 is then carried out.

At box 240, the PFC 46 returns the packet to interface 42b for further processing. Box 250 is then carried out.

At box 250, the interface 42b passes the data packet to network 44b where the data packet is further processed.

Figure 6:
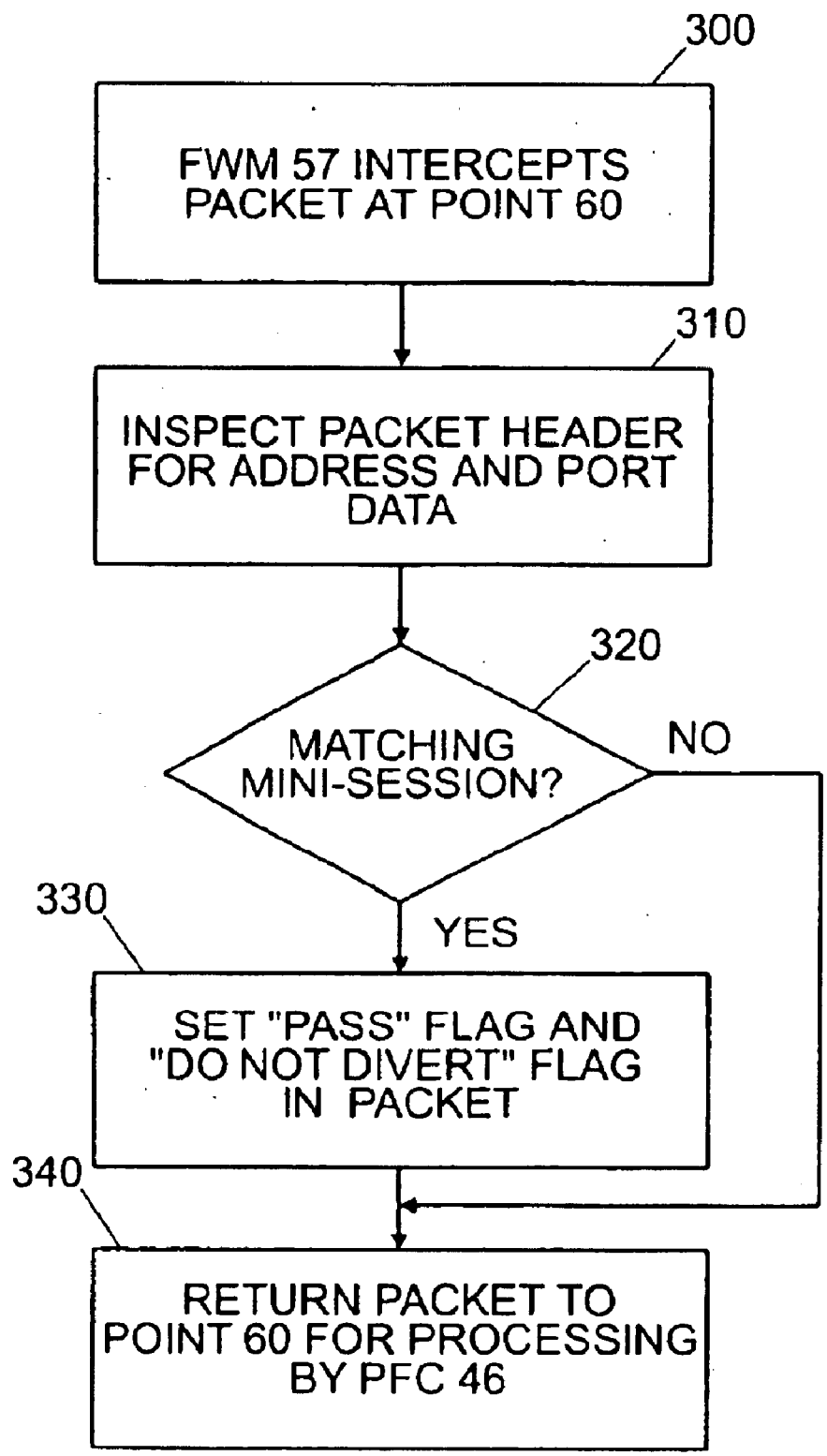
FIG. 6 is a flow chart generally showing the acts associated with the mini-session processes in accordance with the present invention.

Referring now to FIG. 6, as well as FIG. 2 through FIG. 5b, there is generally shown the acts associated with the Firewall Manager (FWM 57) processes in accordance with the present invention. This sequence is carried out during box 120 of FIG. 5b.

At box 300, the FWM 57 intercepts an "entering" packet. In the present illustrative case the packet entering firewall device 10 via interface 42a is intercepted at point 60.

Preferably, FWM 57 intercepts the packet prior to interception by PFC 46 (box 130 of FIG. 5a). Box 310 is then carried out.

At box 310, the FWM 57 inspects the header component of the data packet to ascertain the address (source and destination) and port information contained therein. Box 320 is then carried out.

At box 320, the address and port information obtained in box 310 is compared with the corresponding information in the plurality of mini-sessions 58. If a match is established between the packet and a corresponding mini-session 58 according to address and port information, then box 330 is carried out. Otherwise box 340 is carried out.

At box 330, the intercepted packet has a matching mini-session 58. A match indicates that the intercepted packet is authorized for transfer without ACL verification and firewall application-level inspection through the firewall device 40. Thus, a "pass" flag is set with the packet to communicate this authorization. For example, as shown in FIG. 4, the "pass" bit of flag slot 66 may be set with a "1" bit to indicate a "pass" flag. Conversely, a "0" bit may be used in the "pass" bit of slot 66 to indicate a lack of a "pass" flag. As described above, the PFC 46 will bypass ACL verification if this "pass" flag is set.

The FWM 57 also determines if the intercepted packet has a matching mini-session which can be updated or inspected "in-place". In general, sessions (and mini-sessions) can be updated in-place if application-level inspection is not required. If the mini-session can be updated in-place, a "do not divert" flag (e.g., a "1" bit in the "do not divert" bit of slot 66) is set to communicate that the switching process 48 will bypass firewall application level inspection. Box 340 is then carried out.

At box 340, the packet is returned to point 60 (the interception point) for further processing by the PFC 46.

Figure 7:
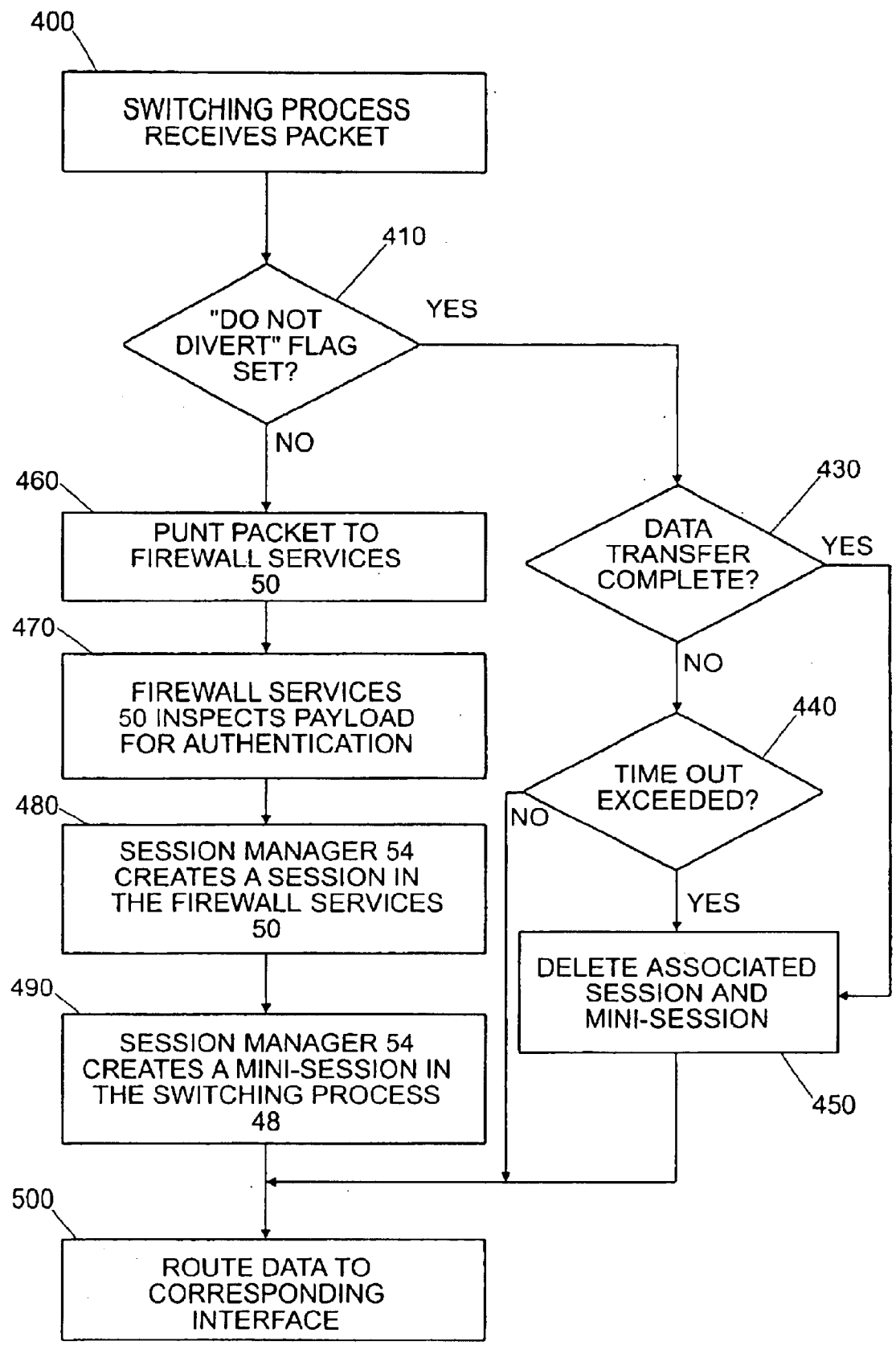
FIG. 7 is a flow chart generally showing the acts associated with the firewall services processes in accordance with the present invention.

Referring now to FIG. 7, as well as FIG. 2 through FIG. 6, there is generally shown the acts associated with the firewall services processes in accordance with the present invention. This sequence is carried out during box 180 of FIG. 5a.

At box 400, the switching process receives a data packet for inspection and routing, typically from the PFC 46. Diamond 410 is then carried out.

At diamond 410, the switching process inspects the data packet to determine whether the "do not divert" flag is set. As described above, the "do not divert" flag is set by the FWM 57 if the intercepted packet has a matching mini-session which can be updated or inspected "in-place" (box 330 of FIG. 6). In general, sessions can be updated in-place if application-level inspection is not required. As noted above, the FWM 57 may be configured to provide application-level inspection, but the switching process 48 suffers a performance penalty for carrying out such inspection. If the "do not divert" flag is set, diamond 430 is carried out, otherwise box 460 is carried out.

At diamond 430, the mini-session (as associated session) can be updated in-place. As such, the intercepted packet is authorized for transfer without ACL verification and firewall application-level inspection through the firewall device 40. Thus, firewall application-level inspection (box 460 and 470) is bypassed. Instead the packet is inspected to ascertain whether the transfer is completed. This check is typically carried out by detecting a signal indicating the end of the data. If the data transfer is completed, box 450 is carried out. Otherwise diamond 440 is carried out.

At diamond 440, the FWM 57 tracks whether a predetermined timeout period for data transfer has been exceeded using conventional methods known in the art, and as described above. The timer to track this timeout period may be maintained by the FWM 57 or by the session manager 54. If the timeout period is exceeded, box 450 is carried out. Otherwise box 500 is carried out.

At box 450, the data transfer has either completed or exceeded the timeout threshold. As such the session and mini-session corresponding to the data transfer are deleted, typically by communicating a request to the session manger 54 which then carries out the deletion of the corresponding session and mini-session. Box 500 is then carried out.

At box 460, the "do not divert" flag is not set for the intercepted packet. Accordingly, the switching process 48 diverts the packet to the firewall services 50 for inspection and authorization of the packet. Box 470 is then carried out.

At box 470, the firewall services component 50 inspects the payload component of the data packet for authentication using conventional application-level inspection means. If the packet is authorized, box 480 is carried out. Otherwise the packet is deleted.

At box 480, the session manager 44 instantiates a session 56 in the firewall services 50 corresponding to the current data transfer. As note above, the created session includes header data (addresses and port information, for example) as well as payload data (user id and communication protocol, for example) to track the data transfer associated with the currently inspected packet. Box 490 is then carried out.

At box 490, the session manger 44 instantiates a corresponding mini-session 58 in the switching process to authorize future data transfers associated with the presently inspected packet. It is noted that as packets are processed herein, the session and associated mini-session are created only once if they do not exists, and not for every packet associated with the corresponding session. Box 500 is then carried out.

At box 500, the packet is then routed to the appropriate interface according to the address information contained in the header of the packet. In the present example, the data packet is communicated from network 44a to network 44b, and thus is routed to interface 42b via point 62 for further processing.

Accordingly, it will be seen that this invention provides a firewall system and method which optimizes the performance of the firewall process by reducing overhead associated with ACL verification and firewall-application level authorization. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. In a firewall device having a plurality of communication interfaces, a packet filtering component coupled to each of the interfaces, a switching process component coupled to each of the interfaces, and a firewall services component coupled to the switching process component, a firewall system comprising:

a) a session manager operating in said firewall services component, said session manager structured and configured to instantiate a plurality of sessions in said firewall services component and a plurality of mini-sessions in said switching process component, each of said plurality of sessions having header and payload information related to a corresponding data transfer within the firewall device, each of said plurality of mini-sessions corresponding to a session and including header information related the corresponding data transfer within the firewall device, wherein said plurality of mini-sessions comprises instantiated software modules residing in the same address space as said switching process component; and b) a firewall module operating in said switching process coupled to said plurality of mini-sessions, said firewall module configured to intercept data packets received into the interfaces, said firewall module further configured to track session context of said data packets.

2. The firewall system of claim 1, wherein said session manager is further structured and configured to manage said plurality of sessions and said plurality of mini-sessions.

3. The firewall system of claim 1, wherein said session manager is further structured and configured to delete said plurality of sessions and said plurality of mini-sessions.

4. The firewall system of claim 1, wherein said firewall module is further configured to intercept data packets before reception by said packet filtering component, said firewall module further configured to set a "pass" flag in data packets according matching header information in intercepted data packets and said header information in said plurality of mini-sessions.

5. The firewall system of claim 4, wherein said packet filtering component is configured to bypass "Access Control List" authorization of data packets having a "pass" flag.

6. The firewall system of claim 1, wherein said firewall module is further configured to intercept data packets before reception by said packet filtering component, said firewall module further configured to set a "do not divert" flag in data packets when packet inspection of said intercepted data packets does not require application-level inspection.

7. The firewall system of claim 6, wherein said firewall module is configured to bypass authorization of data packets having a "do not divert" flag with said firewall services component.

8. In a firewall device having a plurality of communication interfaces, a packet filtering component coupled to each of the interfaces, a switching process component coupled to each of the interfaces, and a firewall services component coupled to the switching process component, a method for optimizing firewall processing comprising:

a) providing a session manager in the firewall services component;

b) providing a firewall module in the switching process component;

c) instantiating a session, by said session manager, for data transfers within the firewall device, said sessions having header and payload information related to data transfers within the firewall device; and d) instantiating a mini-session, by said session manager, corresponding to said instantiated session, said mini-session having header information related to data transfers within the firewall device, wherein said mini-session comprises instantiated software modules residing in the same address space as said switching process component.

9. The method of claim 8, further comprising:
a) intercepting data packets having a header and a payload component, by said firewall module, before reception by the packet filtering component; and
b) setting a "pass" flag in the intercepted data packets when said header component is the intercepted data packets matches said header information in said mini-session.

10. The method of claim 8, further comprising:
a) checking data packets for a "pass" flag, by said packet filtering component; and
b) bypassing "access control list" check, if a "pass" flag is found in said checked data packets.

11. The method of claim 8, further comprising:
a) intercepting data packets having a header and a payload component, by said firewall module, before reception by the packet filtering component; and
b) setting a "do not divert" flag in the intercepted data packets when packet inspection does not require application-level inspection.

12. The method of claim 8, further comprising:
a) checking data packets for a "do not divert" flag, by said firewall module; and
b) bypassing "access control list" check, if a "do not divert" flag is found in said checked data packets.

13. The method of claim 8, further comprising bypassing authorization with the firewall services component, by the firewall module, for data packets header information matching header information in said mini-sessions.

14. The method of claim 8, further comprising deleting said session and associated mini-session when data transfer associated with said sessions and mini-session is completed.

15. The method of claim 8, further comprising deleting said session and associated mini-session when data transfer associated with said sessions and mini-session is idle past a predetermined timeout period.

16. The method of claim 8, further comprising updating context of said mini-session, by said firewall module, without sending packets to said firewall services component.

17. A program storage device readable by a machine, tangibly embodying a program of instructions executable by the machine to perform a method for optimizing firewall processing in a firewall device having a plurality of communication interfaces, a packet filtering component coupled to each of the interfaces, a switching process component coupled to each of the interfaces, and a firewall services component coupled to the switching process component, said method comprising:

a) providing a session manager in the firewall services component;

b) providing a firewall module in the switching component;

c) instantiating a session, by said session manager, for data transfers within the firewall device, said sessions having header and payload information related to data transfers within the firewall device; and d) instantiating a mini-session, by said session manager, corresponding to said instantiated session, said mini-session having header information related to data transfers within the firewall device, wherein said mini-session comprises instantiated software modules residing in the same address space as said switching process component.

18. The program storage device of claim 17, said method further comprising:
a) intercepting data packets having a header and a payload component, by said firewall module, before reception by the packet filtering component; and
b) setting a "pass" flag in the intercepted data packets when said header component is the intercepted data packets matches said header information in said mini-session.

19. The program storage device of claim 17, said method further comprising:

a) checking data packets for a "pass" flag, by said packet filtering component; and b) bypassing "access control list" check, if a "pass" flag is found in said checked data packets.

20. The program storage device of claim 17, said method further comprising:

a) intercepting data packets having a header and a payload component, by said firewall module, before reception by the packet filtering component; and b) setting a "do not divert" flag in the intercepted data packets when said intercepted data packets packet inspection does not require application-level inspection.

21. The program storage device of claim 17, said method further comprising:

a) checking data packets for a "do not divert" flag, by said firewall module; and b) bypassing "access control list" check, if a "do not divert" flag is found in said checked data packets.

22. The program storage device of claim 17, said method further comprising bypassing authorization with the firewall services component, by the firewall module, for data packets header information matching header information in said mini-sessions.

23. The program storage device of claim 17, said method further comprising deleting said session and associated mini-session when data transfer associated with said sessions and mini-session is completed.

24. The program storage device of claim 17, said method further comprising said session and associated mini-session when data transfer associated with said sessions and mini-session is idle past a predetermined timeout period.

25. The program storage device of claim 17, said method further comprising updating context of said mini-session, by said firewall module, without sending packets to said firewall services component.

* * * * *